No. 708,166. Patented Sept. 2, 1902.
G. N. PIFER.
AUTOMATIC PHOTOGRAPHIC APPARATUS.
(Application filed Dec. 13, 1901.)
(No Model.) 8 Sheets—Sheet 1.
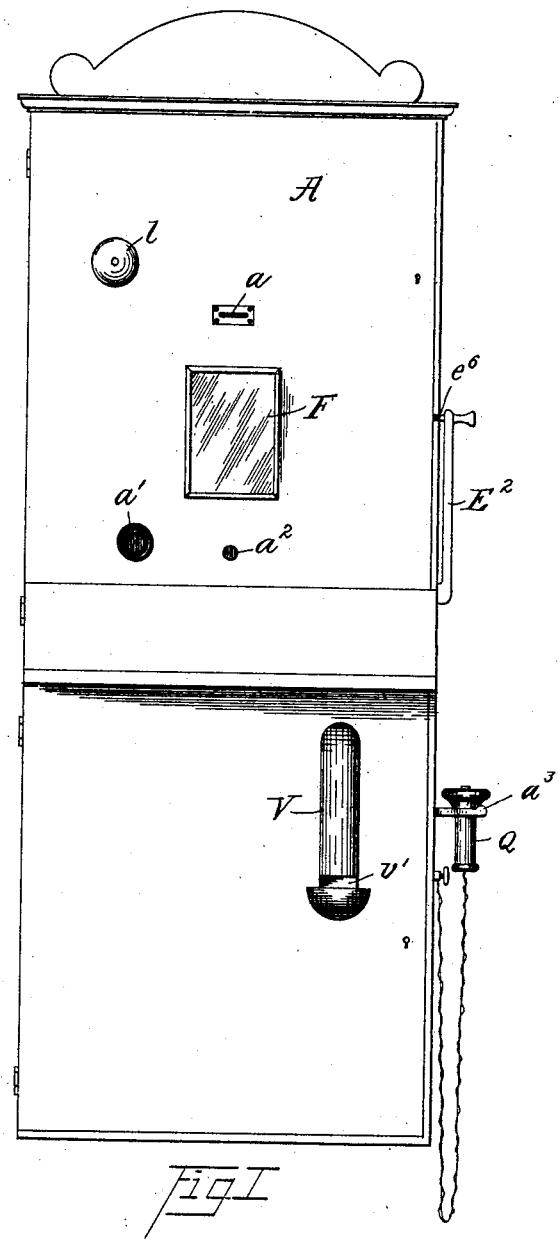
Fig I.
WITNESSES: INVENTOR.
G. N. Pifer
BY
ATTORNEY.

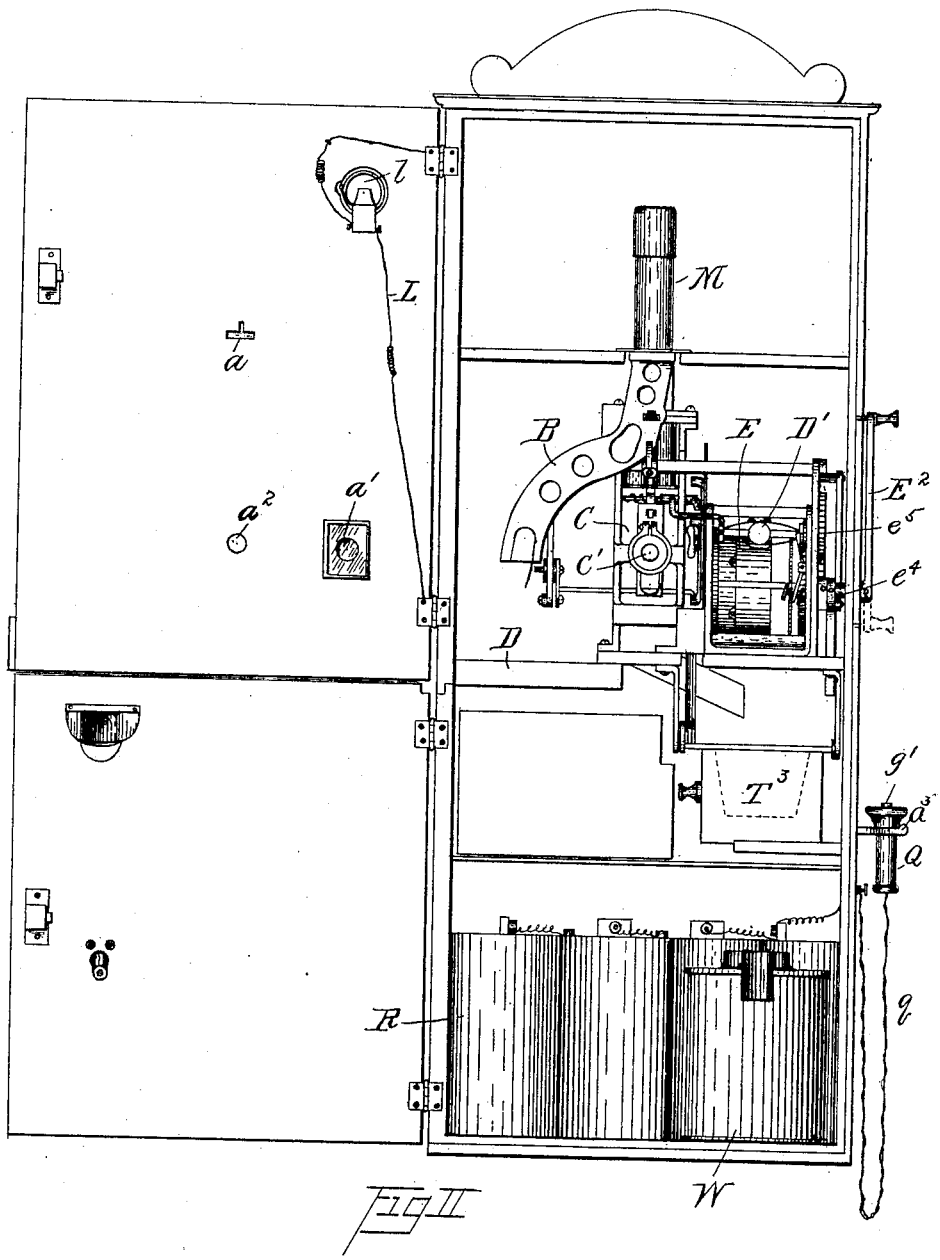

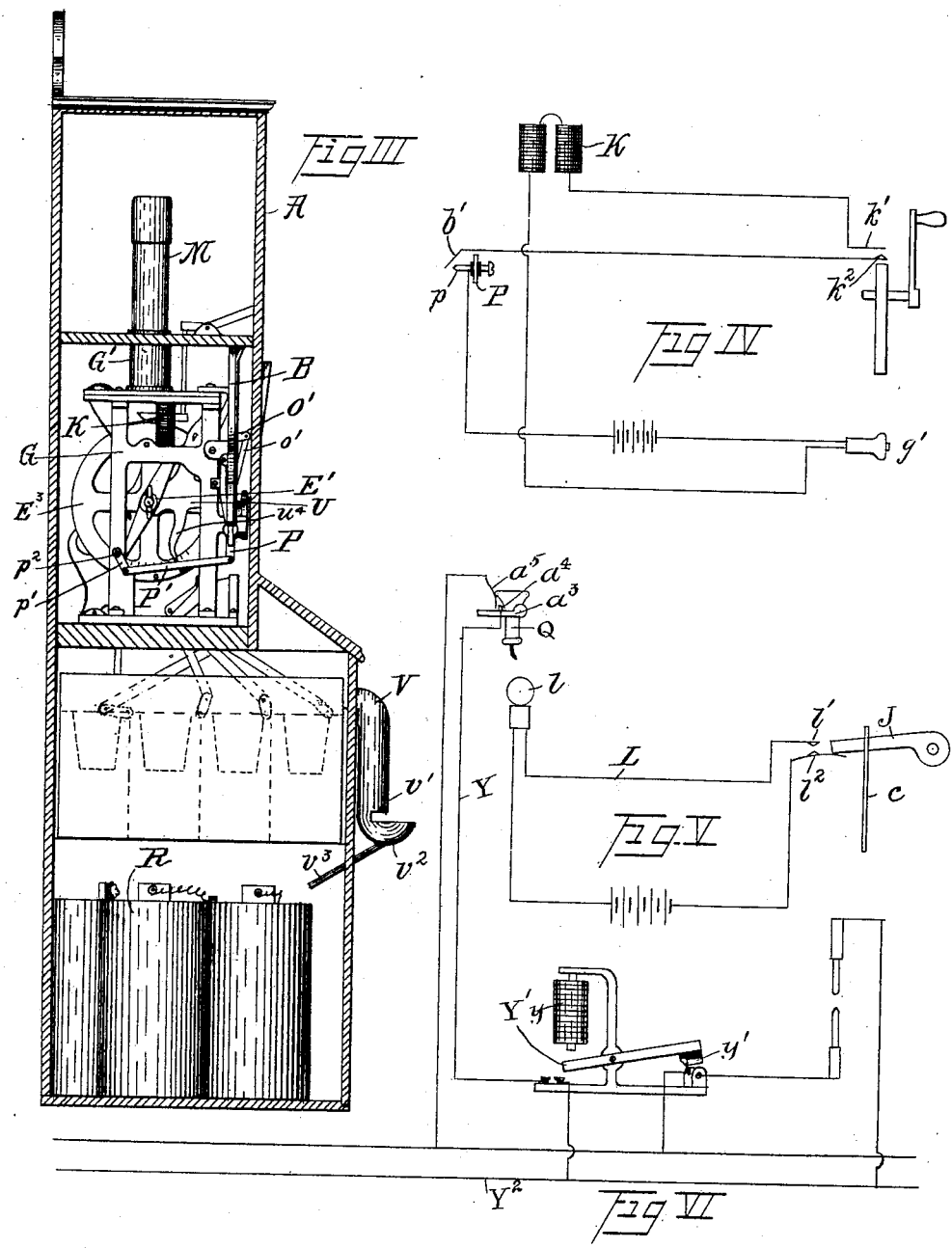

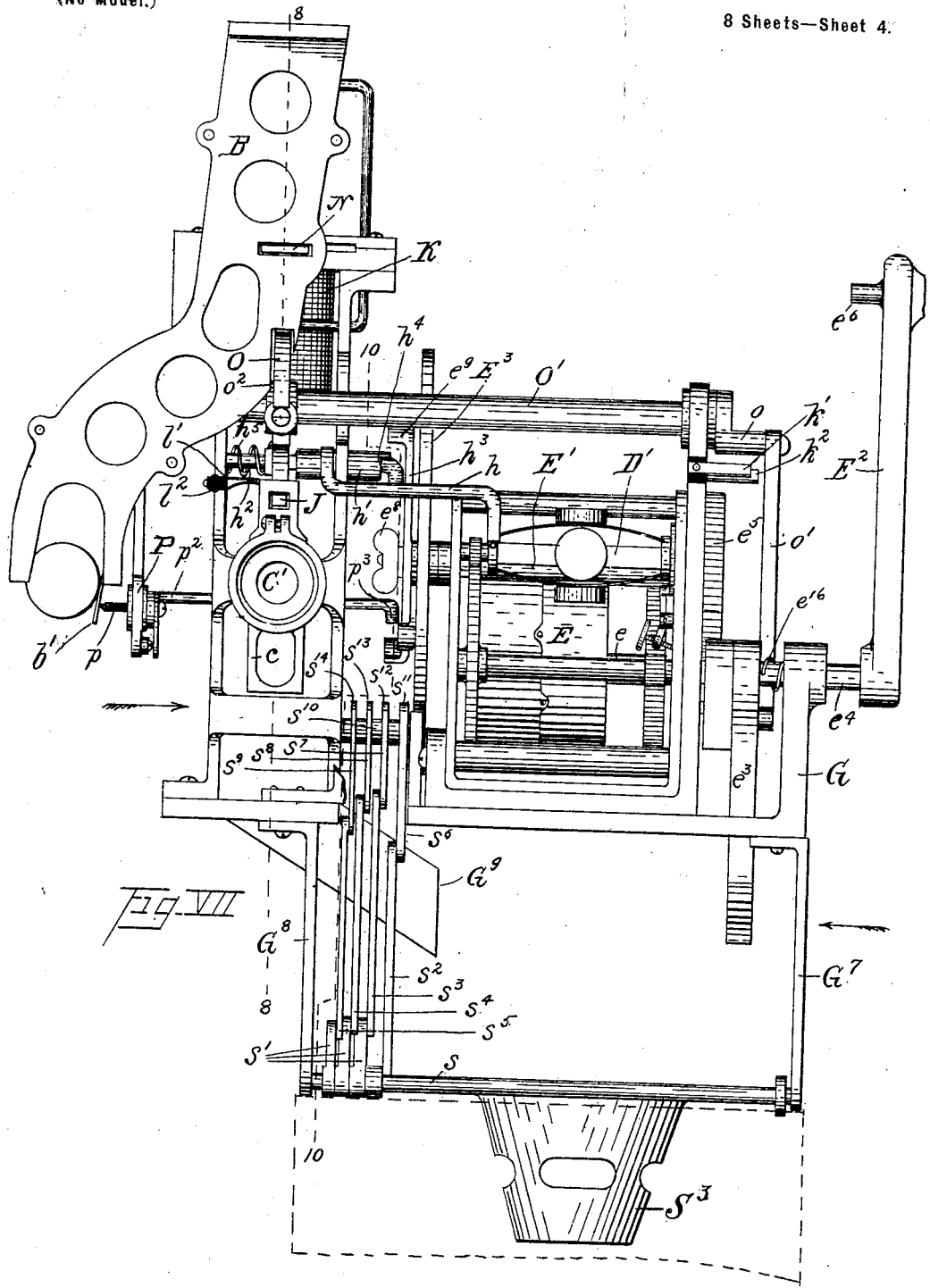

No. 708,166. Patented Sept. 2, 1902.
G. N. PIFER.
AUTOMATIC PHOTOGRAPHIC APPARATUS.
(Application filed Dec. 13, 1901.)
(No model.) 8 Sheets—Sheet 5.
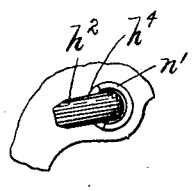
Fig. VIIa.
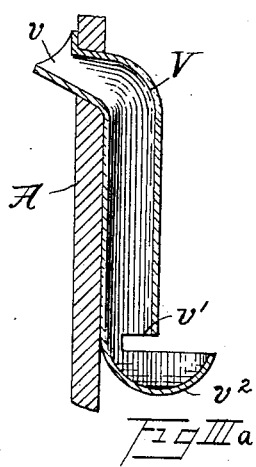
Fig. IIIa.
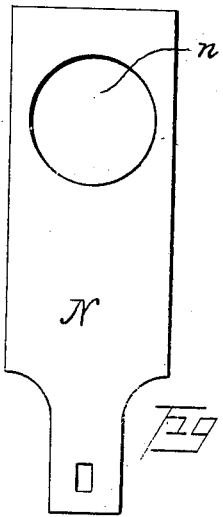
Fig. XIII.
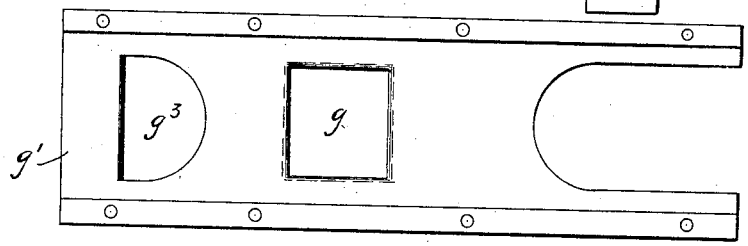
Fig. VIIIa.
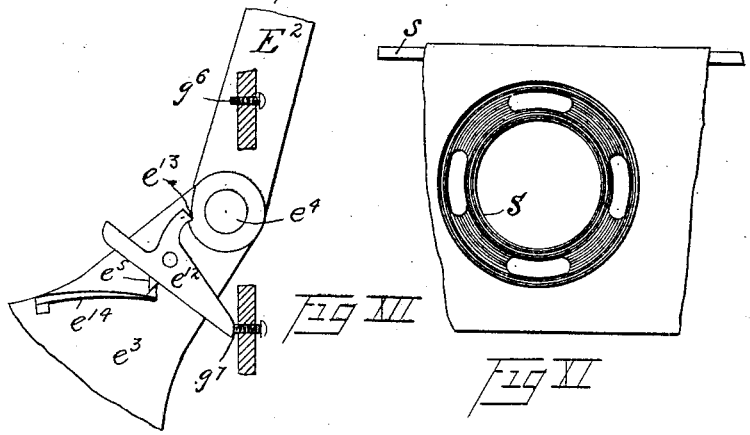
Fig. XII. Fig. XI.
WITNESSES:
A. C. Merkel
Geo. Wm. Sagwell
INVENTOR.
BY G. N. Pifer
J. D. Fay
ATTORNEY.

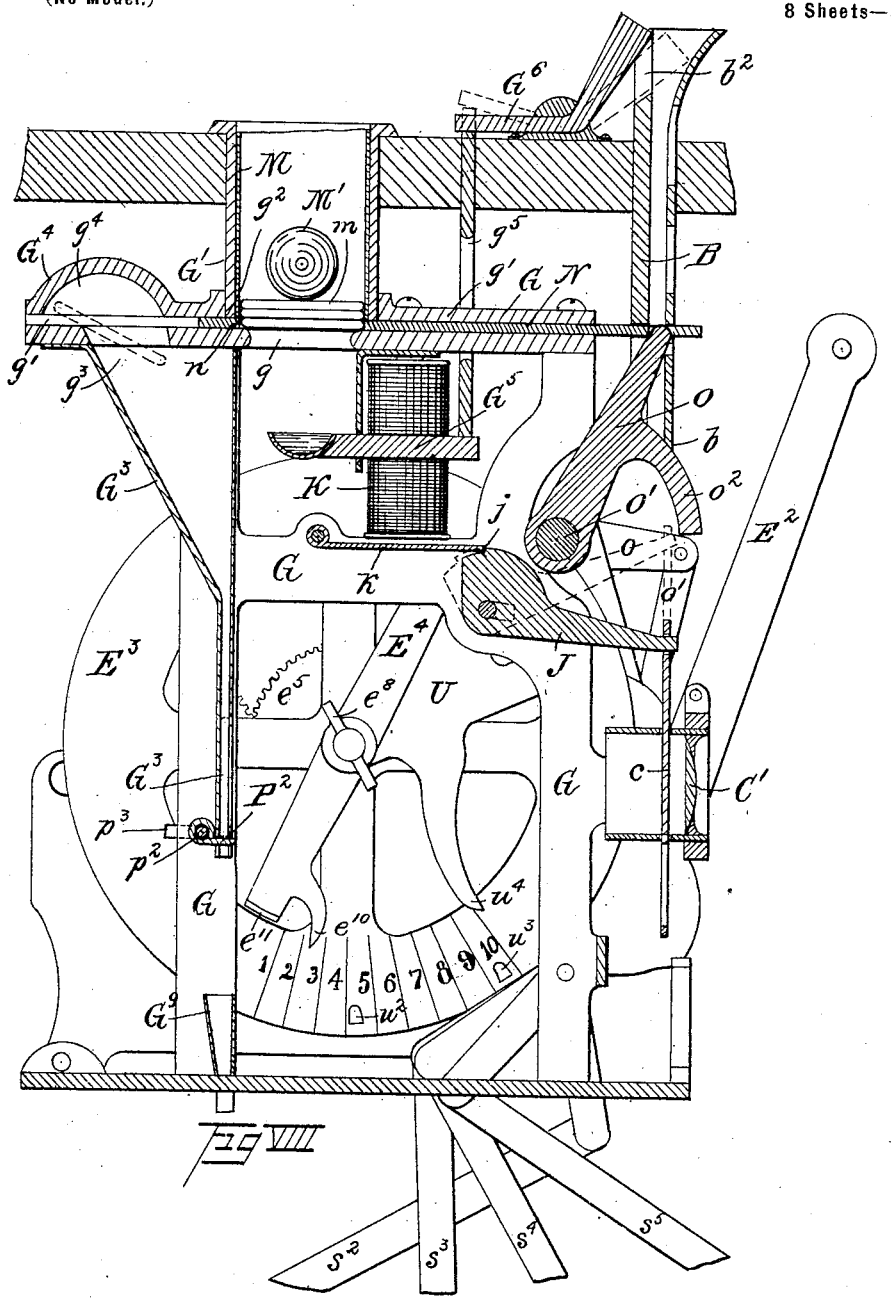

No. 708,166. Patented Sept. 2, 1902.
G. N. PIFER.
AUTOMATIC PHOTOGRAPHIC APPARATUS.
(Application filed Dec. 13, 1901.)
(No Model.) 8 Sheets—Sheet 7.
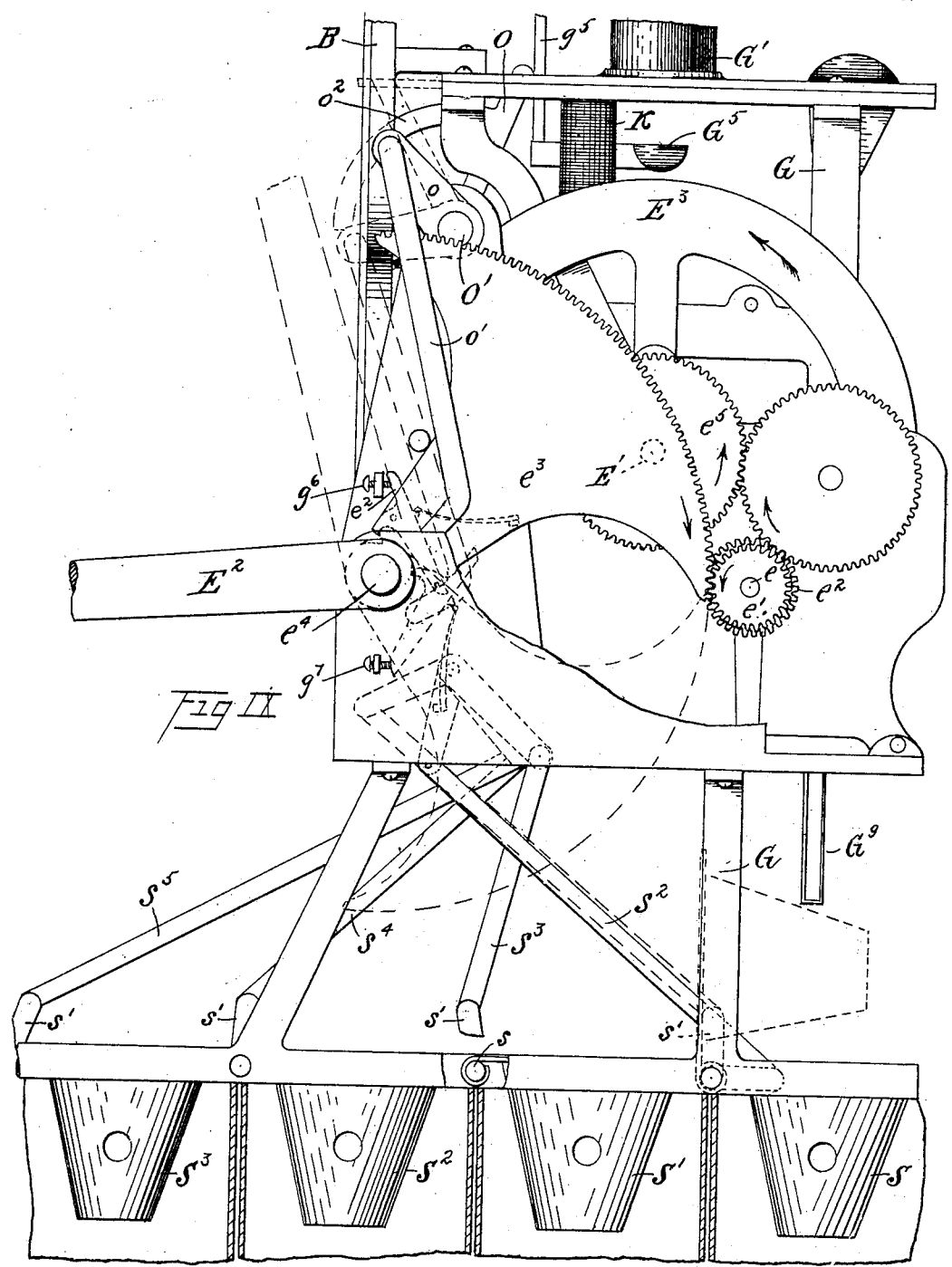
WITNESSES: INVENTOR.
BY
ATTORNEY.

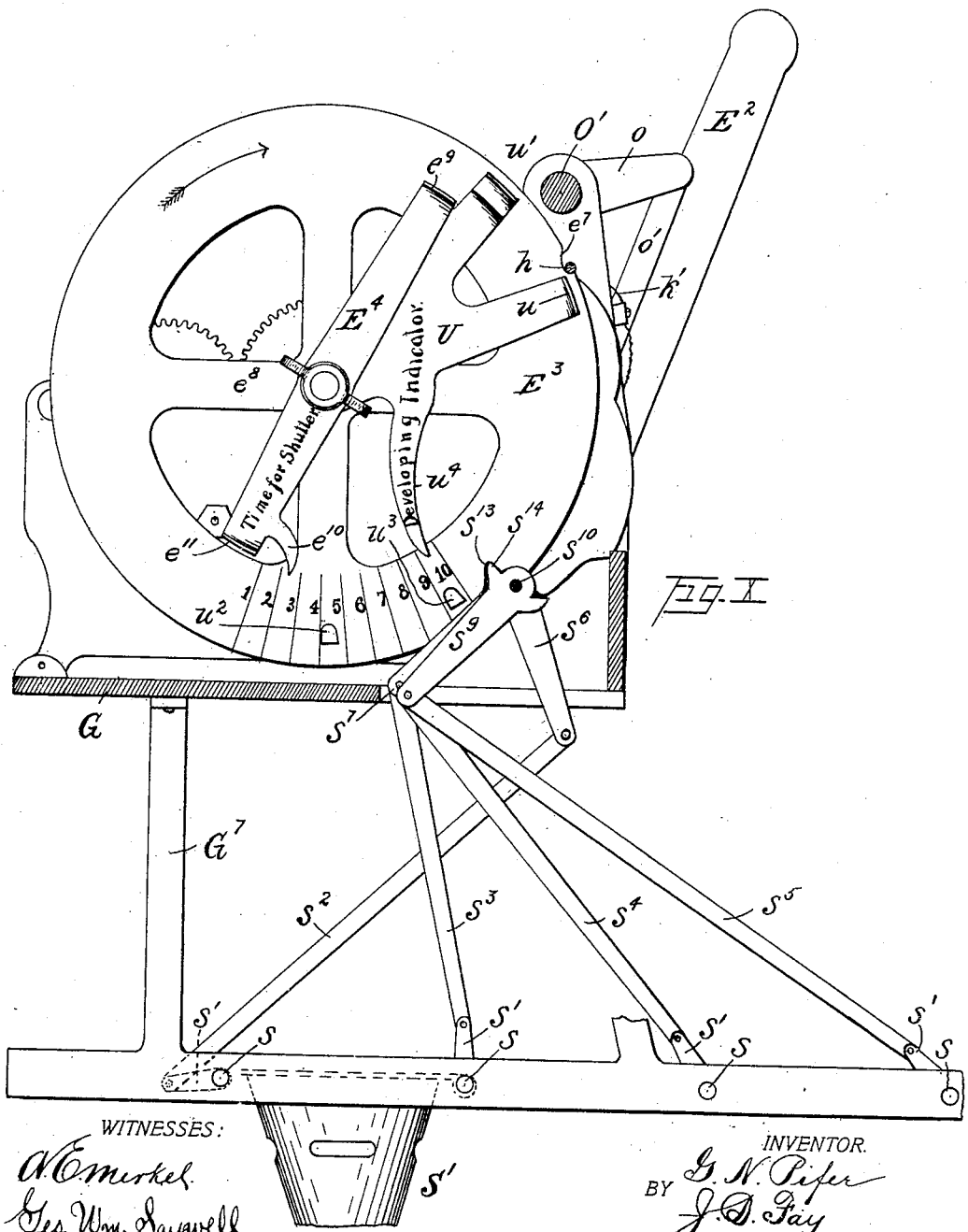

UNITED STATES PATENT OFFICE.

GEORGE N. PIFER, OF CLEVELAND, OHIO, ASSIGNOR TO THE AMERICAN AUTOMATIC PHOTOGRAPHIC COMPANY, OF CLEVELAND, OHIO, A CORPORATION OF OHIO.

AUTOMATIC PHOTOGRAPHIC APPARATUS.

SPECIFICATION forming part of Letters Patent No. 708,166, dated September 2, 1902.

Application filed December 13, 1901. Serial No. 85,730. (No model.)

*To all whom it may concern:*

Be it known that I, GEORGE N. PIFER, a citizen of the United States, and a resident of Cleveland, county of Cuyahoga, and State of Ohio, have invented a new and useful Improvement in Automatic Photographic Apparatus, of which the following is a specification, the principle of the invention being herein explained and the best mode in which I have contemplated applying that principle, so as to distinguish it from other inventions.

My invention relates to coin-controlled machines for automatically producing a photographic likeness, its object being to produce a device of such character which will embody in its design economy of construction and operation, simplicity, and efficiency in a more advantageous degree than has heretofore been obtained in any machine having a similar function heretofore constructed and of which I have knowledge. Said invention consists of means hereinafter described, and specifically set forth in the claims.

The annexed drawings and the following description set forth in detail certain mechanism embodying the invention, such disclosed means constituting but one of various mechanical forms in which the principle of the invention may be used.

In said annexed drawings, Figure I represents a front elevation of a device embodying my invention, showing the form of inclosing box or casing as particularly designed for being hung upon a wall. Fig. II represents a similar front elevation showing the front portion of the casing open and exposing to view the interior mechanism of the device. Fig. III represents a side elevation of the device with one of the sides of the casing removed, showing the interior mechanism in side elevation. Fig. III$^a$ represents a detail vertical section of the discharging-tube. Figs. IV, V, and VI represent diagrammatic views of electrical circuits employed in said device. Fig. VII represents an enlarged front elevation of the main portion of the operating mechanism. Fig. VII$^a$ represents a detail end elevation of a portion of the motor-controlling means. Fig. VIII represents a vertical sectional view of the mechanism shown in Fig. VII, such view being taken upon the plane indicated by the line 8 8, Fig. VII, and viewed in the direction indicated by the arrow on the left of said figure. Fig. VIII$^a$ represents a detail plan view of the plate-feeding slideway. Fig. IX represents a side elevation of said mechanism, on an enlarged scale, viewed in the direction indicated by the arrow on the right of Fig. VII, showing a portion of the framework broken away to expose the mechanism located behind it. Fig. X represents a vertical sectional view of said mechanism, taken upon the plane indicated by the line 10 10, Fig. VII, and viewed in the direction indicated by the arrow on the left of Fig. VII. Fig. XI represents a plan view of one of the plate-carrying holders used in transferring a plate from one finishing solution to the next. Fig. XII represents a detail view of the construction employed for disconnecting the operating-lever from the motor on completion of its energizing stroke, and Fig. XIII a plan view of the plate-slide.

A box or casing A of suitable form is provided for receiving the interior or operating mechanism of the device, the front of such casting being provided with a coin-aperture $a$, Fig. I, through which the coin for controlling the apparatus is introduced, such aperture communicating with the upper end of a coin-duct B, Fig. II. An aperture $a'$, covered with colored non-actinic glass, is formed in said front and provides a "sight" for the lower end of said duct, by means of which the coin may be seen before dropping from said duct. A third aperture $a^2$ is provided and forms an opening for admission of light into the camera through the lens C. Upon the outside of said casing is secured a suitable finder-mirror F, such mirror being preferably that shown and described in my application for United States Letters Patent filed October 25, 1901, Serial No. 79,996.

The interior or operating mechanism consists generally of a plate-magazine M, Fig. II, a camera C, including the lens C', a motor E and gear for engaging same, coin-controlled means for controlling the operation of said motor, plate-feeding means, means for operating the camera-shutter, and a series of finishing-baths T, T', T², and T³, and mechanism for carrying a photographic plate from one to the other of such baths and finally ejecting same from the device, such plate-feeding, shutter-operating, and plate-carrying means being operated by said motor or controlled by means connected therewith. The magazine M is of the construction shown, described, and claimed in my application for United States Letters Patent filed October 25, 1901, Serial No. 79,994, and the plate used in the device is preferably that shown, described, and claimed in my application for United States Letters Patent filed on the above-named date, Serial No. 79,995.

The camera employed consists merely of a lens, a shutter, and means for receiving and holding a plate at a focal plane, the casing A being made light-tight, thereby eliminating the necessity for a separate light-excluding casing for the camera. All the parts above described and their relations with one another will hereinafter be specifically described.

The main frame G is supported upon a transverse shelf D, Fig. II, and supports upon the right, as viewed in Fig. VII, a spring-motor E, by means of which an operating-shaft E' is rotated. The motor is mounted upon a shaft $e$, Fig. IX, upon which are secured two pinions $e'$ and $e^2$, pinion $e'$ meshing with a segment $e^3$, secured to a shaft $e^4$, the outer end of which latter extends laterally through the casing A, as shown in Fig. II. Upon such outer end is secured an operating-lever $E^2$. Pinion $e^2$ meshes with a train of gears, one of which, $e^5$, is mounted upon the operating-shaft E'. By pulling down lever $E^2$ the motor may be energized, and upon the release of the lever at the end of its energizing stroke the motor may be caused to rotate the operating-shaft in the direction indicated by the arrow upon gear $e^5$, Fig. IX. The arrangement of the motor, pinions, operating-shaft, and operating-lever in so far as relates to the mere rotation of the operating-shaft need not be further described, since in this respect the construction is old and well known. It is hence sufficient to state that the motor is energized by the downward stroke of lever $E^2$, whereupon the shaft E' may be rotated, a suitable governor D' being connected therewith to effect a predetermined velocity of rotation. A stud $e^6$ is secured upon the operating-lever and upon the inside of same, which limits and determines the downward movement thereof by contacting the casing A, as shown in dotted lines in Fig. II. Said lever $E^2$ is secured to the shaft $e^4$, so as to automatically become disconnected therefrom upon reaching the end of its energizing stroke and reëngage same when the segment has reached its original or initial position after the completion of the operation of the motor, as will hereinafter appear. Upon the inner end of the operating-shaft is secured a disk $E^3$, to which I shall hereinafter refer by the term "operating-wheel." Said wheel is provided upon its periphery with a notch $e^7$, Fig. X, in which rests a stop-arm or detent $h$ of mechanism for controlling the motor's operation, Figs. VII and IX. While such arm rests in said notch the rotation of the operating-wheel is prevented and the motor thereby rendered inoperative when in its energized as well as in its non-energized condition. Said stop-arm is secured to a sleeve $h'$, loosely and oscillatorily mounted upon an oscillatory rod $h^2$, Fig. VII, mounted in the frame G. Secured upon said rod is an arm J, Fig. VIII, to the outer end of which is attached the lens opening and closing shutter $c$. Said arm is provided with a shoulder $j$, which is engaged by a hinged armature $k$ of a magnet K when the shutter is closed, as shown in Fig. VIII. Such engagement is maintained by a helical spring $h^5$, Fig. VII, secured to the rod $h^3$ and frame, respectively. Said spring is set in tension, so as to raise the shutter to its open position when armature $k$ is lifted from engagement with the arm J, as shown in dotted lines in said Fig. VIII. Sleeve $h'$ actuates the detent $h$, as will hereinafter appear.

It is therefore seen that the armature $k$, arm J and its actuating means, and detent $h$ constitute means for controlling the operation of the motor, the magnet controlling the operation of the said arm and the latter actuating the detent, such magnet also controlling the operation of the shutter-operating means. These latter means hence actuate that part of the controlling means which directly controls the motor's operation—that is, the detent.

The inner end of rod $h^2$ is formed with a projecting lip $h^3$, Fig. VII$^a$, and the adjacent end of sleeve $h'$ with a recess $h^4$, which permits the rod $h^2$ to be oscillated within limits prescribed by said notch independently of said sleeve, so that the movement of said rod attending the upward movement of arm J is attended by an upward movement of the detent $h$, whereby the latter is released from the notch $e^7$ and the motor permitted to operate, the recess $h^4$ being located so as to effect such action. This described construction hence allows the rod $h^2$ and arm J to be moved back and the shutter to be closed independently of the detent $h$.

Upon the inner end of the operating-shaft E' is secured, by means of a thumb-nut $e^8$, Fig. X, a radially-adjustable arm $E^4$, such adjustment being obtained by loosening and then tightening said thumb-nut, as will be readily understood. The end of such arm which is uppermost when the operating-wheel notch $e^7$ is engaged by the detent is provided with an offset lip $e^9$, whose path of revolution intersects the lip $h^3$ when the rod $h^2$ occupies the position coincident with the raised or open position of the shutter $c$, whereby it is seen that the said rod may upon the rotation of the operating-wheel be turned back by the engagement of said offset lip $e^9$ and the lip $h^3$, and the shutter thereby closed, so as to exclude the light from the lens. The opposite end of such arm is provided with an indicating-pointer $e^{10}$, and the adjacent portion of the operating-wheel face is angularly divided by radial lines into spaces representing seconds of time, the divisions being hence angular in length and corresponding with the distance traversed by the wheel during the period of one second. It is therefore seen that the interval intermediate of the time of opening and closing the shutter may be definitely determined and varied by shifting the position of said arm. The indicating-marks are located and numbered so as to accurately indicate in seconds the length of such interval.

An electrical alarm-circuit L, Fig. II, is provided, containing a bell $l$, located at a convenient point from whence it may be readily heard and includes a pair of contacts $l'$ and $l^2$, Fig. VII, located in the vicinity of the shutter-operating arm J, these contacts being out of engagement when the shutter is in its closed position. One of said contacts is located in the path of movement of the said arm, so that on the upward movement of the latter electrical connection is effected, the circuit closed, and the alarm sounded during the time the shutter occupies its open position. Such circuit and its relationship with the shutter are diagrammatically illustrated in Fig. V. Upon the upper portion of the frame G is secured a tubular magazine-seat G', in which the magazine M is telescoped. Immediately below the lower end of said seat is a square aperture $g$ of less diameter than the plates $m$ in the magazine. Transversely of the bottom of said seat is a slideway $g'$, which forms a lateral opening $g^2$, through which the plates may be removed successively, as will hereinafter be described. In said slideway is a slide N, having an opening $n$, adapted to receive a plate. In the rear end of said slideway is formed a semicircular opening $g^3$, having its curved side on the side farthest toward and the straight side farthest away from the magazine, as shown in Fig. VIII$^a$. The front end of said slide N is engaged by a lever O, which is secured to an oscillatory shaft O', journaled in the upper front portion of the frame, Figs. VII and VIII. The right-hand end of said shaft is provided with a crank-arm $o$, to which is attached a connecting-rod $o'$, whose lower end is attached to the segment $e^3$. The connections between the segment and slide above described are arranged in a manner such that the opening $n$ will fall immediately below the magazine when the operating-lever $E^2$ is occupying its upper position—that is, that which it occupies at the beginning of its energizing stroke—such relative position of these two elements being shown in Fig. VIII. The oscillation of lever $E^2$ is hence, as is seen, attended by the reciprocation of slide N. The length of travel of said slide is such as to carry a plate from the magazine over the opening $g^3$ and permit same to drop through such opening. Such opening communicates with a chute $G^2$, which leads downwardly, as is shown in said Fig. VIII. The plates are placed in the magazine with their sensitized surfaces up, so that such surface of the lowermost plate is not exposed when it is necessary for the purpose of repairs or adjustment to open the front of the casing. It is necessary to transport the plates from the magazine and cause them to fall into the chute $G^2$ with their sensitized surface toward the front, so as to bring such surfaces into the desired focal plane. Such desired result is effected by the peculiar form and location of the opening $g^3$. As before stated, this opening is semicircular in form, such statement, however, describing it but generally. Its actual form is that of a semicircle plus an additional area of a width not less than the diameter of the semicircle. Such diameter is made slightly greater than that of a plate. Hence when a plate moves over the said opening it remains in the slideway until the centers of the semicircle and the plate coincide, at which point the center of gravity of the plate falls without the base or supporting portion of the slideway, thus causing the plate to fall forward and drop into the chute with its sensitized face forward, as is required. A covering $G^4$ is provided for excluding the light from the slideway and is provided with a concave portion $g^4$ over the opening $g^3$, which permits the plate to tilt while dropping through the latter. At the front of the device is provided a coin-duct B, as before mentioned, such duct being flared at its upper end, the front lip of such flaring portion being in close proximity to the coin-slot $a$ when the casing is closed, so that a coin may be introduced into same from the exterior. The lower part of said duct is curved toward one side—the left, as illustrated—to avoid intercepting the light, which it is desired to allow to enter the lens-aperture $a^3$, and intermediate of its ends is formed a slot $b$, into which projects a wing $o^2$, forming part of the slide-operating lever O and which normally intercepts the coin-path and prevents a coin from dropping to the bottom of the duct until the slide N is moved backward its full distance—that is, until the operating-lever has reached the end of its energizing stroke.

Immediately below the aperture $g$, Fig. VIII, is located the cup-shaped end of a lever $G^5$, which is connected by means of a rod $g^5$ with an oscillatory lever $G^6$, one arm of which is capable of being swung into the upper portion of the coin-duct through an opening $b^2$, and thus intersect the upper end of the coin-path. This end of said lever $G^6$ is made sufficiently wide to effectually obstruct the coin-path and prevent the introduction of a coin. Normally said lever end is caused to lie outside of such path. On the removal of the last plate of the magazine the weight M', described in my above-named application, Serial No. 79,994, drops into the cup-shaped end of lever $G^5$ and by its weight tilts the lever $G^3$, so as to effectually prevent the subsequent introduction of a coin. Such obstruction remains until the weight is removed. This is done on reloading the machine with a filled magazine. The manner of such loading is fully described in my above-named application and hence need not be here specifically described. At the bottom of said duct and laterally of the coin-path is a pair of electrical contacts, one of which consists of an elastic metal strip $b'$ and the other of which consists of an adjustable screw $p$, secured to an oscillatory arm P, suitably journaled upon the frame and connected with and operated by a rod $P'$, whose rear end is connected with an oscillatory arm $p'$, Fig. III, secured to a rock-shaft $p^2$. Said shaft extends transversely to the right and has its extremity formed with an angularly-projecting lip $p^3$, which normally intersects the path of the lower end of the adjustable shutter-operating arm $E^4$, which is provided with a laterally-projecting lip $e^{11}$, Fig. VII, adapted to engage the projecting lip $p^3$, oscillate rock-shaft $p^2$, and through the medium of rod $P'$ oscillate arm P. Normally—that is, when no coin is located in the bottom of the coin-duct—the position of arm P is such as to bring the screw-contact $p$ directly to the right of the spring-contact $b'$, but not into contact therewith. Upon introducing a coin into the coin-duct and permitting it to fall to the lower end thereof it strikes contact $b'$ and moves same into contact with contact $p$. The latter is, however, placed at a distance such as to prevent contact $b$ from moving a distance sufficient to permit such coin to drop out of the duct. The coin is thus held suspended and the two contacts in contact with each other. It is hence seen that the oscillation of arm P would disengage the two contacts and permit the coin to drop from the coin-duct. The rock-shaft $p^2$ is journaled immediately behind the chute $G^3$, Fig. VIII, and upon it is secured a valve $P^2$, which normally holds a plate which has been discharged, as previously described, from the slideway through the aperture $g^3$, its location being such as to effect such holding so as to bring the plate's sensitized surface into the focal plane of the camera directly behind the lens, as shown in said figure. It is hence seen that the breaking of contact of the two contacts $b'$ and $p$ may be attended by the release of a plate from the bottom of chute $G^3$ as a result of the engagement of the lips $e^{11}$ and $p^3$. The said two contacts, as diagrammatically illustrated in Fig. IV, are placed in the same circuit with the magnet K, and in this same circuit are placed two other contacts $k'$ and $k^2$ in a position such that, as shown Fig. IX, they will be brought into contact by the segment $e^3$ at the end of the energizing stroke of the operating-lever $E^2$. A third pair of contacts are included in this same circuit and are located in a handle Q upon the outside of the casing and connected by means of a suitable flexible connection $q$, whereby it may be hung upon a hook $a^3$ or removed therefrom and carried about. These contacts, normally open, are caused to engage by means of a push-button $q'$. Such construction is shown diagrammatically in Fig. IV.

Suitable batteries R, Figs. II and III, are provided in the bottom of the casing for providing current for the electrical circuits described.

A chute $G^9$ leads from valve $P^2$ to the right, as shown in Fig. VII.

To the lower part of the main frame G are secured two hangers, Figs. VII and IX, $G^7$ and $G^8$, in which are journaled four transversely-located rock-shafts $s$, and upon the middle portion of each such shaft is secured at its upper peripheral portion a plate-carrier S, $S'$, $S^2$, and $S^3$, respectively, of frusto-conical shape and having its bottom open or perforated and its sides provided with perforations, as shown in Fig. IX. The inner surface of each carrier is of curved formation, whereby the sensitized or film surface of a plate is prevented from coming into contact therewith and becoming defaced. Each carrier depends into a tank T, $T'$, $T^2$, and $T^3$, respectively, these tanks being juxtaposed, as shown, and containing the developing, rinsing, and fixing liquids, the rearmost tank containing the developer, the next toward the front a rinsing or washing liquid, such as water, the next a fixing solution, and the foremost a second washing liquid, tank T being located beneath chute $G^9$. Each rock-shaft is provided with a rocker-arm $s'$, to which is secured a rod $s^2$, $s^3$, $s^4$, and $s^5$, respectively. The upper end of each such rod is secured to a trip-lever $s^6$, $s^7$, $s^8$, and $s^9$, respectively, all of which are mounted so as to aline transversely and oscillate upon a rod $s^{10}$, Fig. X, secured in the frame, as shown in Fig. VII. Each trip-lever is provided with a shoulder $s^{11}$, $s^{12}$, $s^{13}$, and $s^{14}$, respectively. By engaging these shoulders successively it is seen that the plate-carriers may be caused to tilt forward and out of the tanks successively so as to discharge a plate from one tank into the next. To effect such successive tilting, the operating-wheel $E^2$ is provided with four laterally-projecting lugs $u$, $u'$, $u^2$, and $u^3$, respectively, lugs $u$ and $u'$ being formed upon an arm U, angularly adjustable upon and secured to shaft $E'$ by means of the thumb-nut $e^3$. The path of lug $u$ intersects the shoulder $s^{11}$ of lever $s^6$, which is connected, as shown, with the carrier S, depending into the developing-solution tank T; that of lug $u'$ intersects shoulder $s^{12}$ of lever $s^7$, which operates the next carrier $S'$, depending into tank $T'$; that of lug $u^2$ intersecting shoulder $s^{13}$ of lever $s^8$, and that of lug $u^3$ intersecting shoulder $s^{14}$ of lever $s^9$, which are connected by the described lever systems with carriers $S^2$ and $S^3$, depending into tanks $T^2$ and $T^3$, respectively. Lugs $u^2$ and $u^3$ are permanently secured to the operating-wheel. It is hence seen that by varying the angular position of arm U the interval intermediate of the time of starting the motor and the engagement of lug $u$ with lever $s^6$ may be varied so that a plate having been previously discharged into carrier S, the length of time such plate may be left in the developing solution in tank T may be varied according to the character of such solution. Arm U is provided with a pointer $u^4$, which, in connection with the indicating-marks on the operating-wheel, may be used for definitely determining the length of time during which it is desired to subject the plate to the action of the developer. The angular distance between lugs $u$ and $u'$ hence determines the time of washing the plate, and since this time may be made practically constant it is preferable to form such lug on the arm U, as shown. Similarly the distance between lugs $u^2$ and $u^3$ is made constant. The variation of time for fixing occasioned by varying the distance between lugs $u'$ and $u^2$ as a result of any variation of the angular location of arm U does not appreciably effect the fixing operation, since the time of the latter is very much greater than the time of developing or washing, as is shown by the comparative distances between lugs $u$ and $u'$, $u^2$ and $u^3$, and $u'$ and $u^2$.

In the front wall of the casing and in proximity to the foremost tank $T^3$ is a discharging-tube V, having its receiving-opening $v$ located in the lateral tube-wall and upon the inside of the casing in a position such that the carrier $S^3$ will upon being tilted discharge a plate into such opening. Said tube extends downwardly upon the outside of the casing and is provided with a discharge-opening $v'$, Fig. $III^a$, below which and removed a short distance therefrom is a portion $v^2$, extending transversely of the tube-bore and forming a receiving-cup and also serving to prevent direct rays of light from entering the tube. This portion $v^2$ and the location of the receiving-opening together diffuse the light to such an extent that practically no actinic rays reach the interior of the casing. A pipe $v^3$ is connected with an opening $v^4$ in the bottom of cup $v^2$ and discharges into a suitable receptacle W upon the inside of the casing, Fig. II.

In order that after moving the operating-lever throughout the length of its engaging stroke it may not again be actuated so as to effect the operation of the mechanism, I provide means for disconnecting such lever on reaching the end of such stroke. To this end I provide upon the side of segment $e^3$ nearest lever $E^2$ a pawl $e^{12}$. Said lever is loosely mounted upon shaft $e^4$ and is provided with a notch $e^{13}$, which is engaged by said pawl. Such engagement is maintained by means of a spring $e^{14}$, which rests upon a lug $e^{15}$, formed upon said pawl. At a point near the end of the energizing path of movement of the segment is an adjustable screw $g^6$, mounted in the frame G, adapted to engage said pawl and disengage same from said lever, said spring maintaining such disengagement by pressing upon the opposite side of said lug. A helical spring $e^{16}$, Fig. VII, is connected with the lever $E^2$ and carries same when released upwardly into its initial position, the segment meanwhile being drawn slowly down by the motor. A second adjustable screw $g^7$ is secured to the frame near the other end of the segment's path of movement, so that upon reaching such end the pawl is engaged from the opposite side and pushed over into its initial position, thereby reëngaging the lever.

The construction having been described, I shall now describe the operation of the device.

A coin is dropped into the slot $a$ and passes down the duct B until it is arrested by the obstructing wing $o^2$. The subject having removed the handle Q from its supporting-hook now pulls down the lever $E^2$ until the stud $e^6$ engages the side of the casing. Such action disengages the lever, as above described, which upon being released is returned to its initial position by spring $e^{16}$. Such operation of the lever removes wing $o^2$ from the duct and permits the coin to drop and effect contact between the contacts $b'$ and $p$, the segment $e^3$ having meanwhile effected contact between the contacts $k'$ and $k^2$ and also removes the lowermost plate $m$ from the magazine, such plate having previously dropped into aperture $n$ of carrier N. Said plate is then carried back, dropped through aperture $g^3$, and permitted to fall upon valve $P^2$, where it is held in the focal plane. These functions are all performed before the exposing operation. The subject having assumed by the aid of the finder the proper position with reference to the camera, as described in my above-named application, Serial No. 79,996, then presses the button $q'$. Such action completes the magnet-circuit, and the current, passing through magnet K, releases arm J, which is then moved upwardly by the spring $h^5$, carrying with it the shutter $c$, the rod $h^2$, and hence the detent $h$. The operating-wheel being now free, the motor starts its rotary movement, exposure of the plate meanwhile taking place. Such lifting of the shutter permits the contacts $l'$ and $l^2$ to engage and close the bell-circuit, the bell thereby being caused to ring during the exposing process and permitting the subject to be notified of the time of the exposure in order that he may remain immovable during such period. After the lapse of time determined by the angular position of arm $E^4$ lip $e^9$ engages lip $h^3$ and turns back rod $h^2$, thereby returning the shutter to its closed position and breaking the bell-circuit. Meanwhile segment $e^3$ has traversed some distance on its return travel and broken the magnet-circuit by permitting contacts $k'$ and $k^2$ to disengage. Such circuit may also be broken by releasing the button $q'$; but contacts $k'$ and $k^2$ are provided for insuring such breaking independently of the operator, thereby preventing the armature from remaining in its raised position after the beginning of the operation. This insures the absolute equality and definiteness of length of exposure, inasmuch as its absence would permit the operator to repeat the exposure by continuing to press the button during the interval between the return or closing of the shutter and discharge of the coin from the duct—that is, the breaking of the circuit at the contacts $p$ and $b'$—since the armature would not be in position to lock the arm $J'$ at the end of the downstroke of the latter. Hence the instant the said circuit is broken the armature $k$ drops and is in position to catch and hold arm $J$. Said arm on being drawn down by the action of the lip $e^9$ is so caught and held throughout the remainder of the operation. The rotation of the operating-wheel meanwhile continues, detent $h'$ riding upon its periphery. Immediately following the above-described operation lip $e^{11}$ engages the offset lip $p^3$, opens valve $P^2$, thereby permitting the exposed plate to drop into the carrier $S$ through chute $G^9$, and thus into the developing solution. At the same time contact $p$ is withdrawn from its engagement with contact $b'$ by the action of the rock-shaft $p^2$, thus permitting the coin to become disengaged from the duct B and drop into a suitable receptacle beneath. The continued rotation of the operating-wheel now brings the lugs $u$, $u'$, $u^2$, and $u^3$ into engagement, respectively and successively, with trip-levers $s^6$, $s^7$, $s^8$, and $s^9$, whereby the carriers $S$, $S'$, $S^2$, and $S^3$ are successively tilted and the plate dumped from the rearmost tank into each successive tank and finally into the delivery or discharge tube V and cup $v^2$, from whence it may be removed by the subject. At the completion of such operation, which takes place throughout one complete rotation of the operating-wheel, detent $h$ reëngages notch $e^7$ and stops the motor. For this purpose the rod $h^2$ is provided with an arm $h^6$, Fig. VII, which engages and stops the governor $D'$, thereby interrupting the operation of the motor. Segment $e^3$ has at the same time reached the end of its return travel and reengaged the operating-lever $E^2$, and slide N has returned and received the lowermost plate $m$ in its aperture, the entire mechanism being thus ready for a repetition of the complete operation above described. When the plates are exhausted, as previously described, the lever $G^6$ tilts forward and obstructs the upper end of the coin-duct, so as to prevent the subsequent introduction of a coin. Such action hence effectually locks the device and prevents the further operation of the mechanism, thereby prohibiting the loss of a coin, which might otherwise occur were such obstruction absent and also prohibiting the unnecessary or unproductive operation of the mechanism. It is also seen that by reason of the fixed relationship existing between the means for operating the shutter-closing mechanism—that is, the lip $e^9$ and lip $e^{11}$—the plates cannot be discharged from the focal plane until the exposure is complete, such discharge always occurring after the shutter is closed.

In addition to the above-described mechanism I also provide means operating in connection therewith for producing an artificial actinic light, preferably an electric-arc light. To this end I provide in proximity to the hook $a^3$ two contacts $a^4$ and $a^5$, one of which $a^5$ is of the spring variety and located so as to normally open and break a magnet-circuit Y. An armature $Y'$, operable by magnet $y$ in said circuit, is provided with a switch member $y'$ of a switch in an arc-lamp circuit $Y^2$ normally open. The contact $a^5$ is located so as to become engaged by the handle Q to disengage contact $a^4$ when the said handle is hung in the hook $a^3$. Upon removal of said handle from the hook, contacts $a^4$ and $a^5$ engage, complete the circuit Y, whereby the magnet becomes excited and attracts the armature $Y'$, thus closing the switch and the circuit $Y^2$ and lighting the arc-lamp. Such lamp is placed in a location such as to properly illuminate the subject when in proper position before the camera.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention—

1. In automatic photographic apparatus, the combination of a photographic magazine, a motor, means for energizing said motor, means for feeding a plate from said magazine, such energizing and plate-feeding means being operatively connected whereby a plate may be fed simultaneously with the energizing of the motor.

2. In automatic photographic apparatus, the combination of a plate-magazine, a motor, an operating-lever for energizing said motor, and a reciprocatory slide positively connected with said lever for feeding a plate from said magazine.

3. In automatic photographic apparatus, the combination of a plate-magazine, a motor, an operating-lever for energizing said motor, and means for feeding a plate from said magazine and positively connected with said lever.

4. In automatic photographic apparatus, the combination of a motor, a plate-magazine, an operating-lever for energizing said motor, means for feeding a plate from such magazine and controlled by the operation of said lever, and plate exposing and finishing means controlled by such lever.

5. In automatic photographic apparatus, the combination of a motor, a plate-magazine, an operating-lever for energizing said motor, means for feeding a plate from said magazine and controlled by the operation of said lever, and plate exposing and finishing means controlled by said lever and operated by said motor.

6. In automatic photographic apparatus, the combination of a motor, a plate-magazine, an operating-lever for energizing said motor, means for feeding a plate from said magazine and controlled by the operation of said lever, plate exposing and finishing means operated by said motor, and an electric circuit containing means for controlling the action of the motor, such circuit being controlled by said operating-lever.

7. In automatic photographic apparatus, the combination of a motor, a plate-magazine, an operating-lever for energizing said motor, means for feeding a plate from said magazine, plate exposing and finishing means operated by said motor, an electric circuit containing a magnet, means for interrupting the action of such motor controlled by said magnet, and circuit-closing means operated by said operating-lever.

8. In automatic photographic apparatus, the combination of a motor, a plate-magazine, an operating-lever for energizing said motor, means for feeding a plate from said magazine, a shutter for exposing a plate and means for operating same, plate-finishing means operated by said motor, an electric circuit containing means for controlling the opening of said shutter, means for closing the latter, means for interrupting the action of the motor, means in said circuit for controlling such interrupting means, such circuit being controlled by said operating-lever, and means operated by the motor for actuating the finishing means subsequently to the opening and closing of the shutter.

9. In automatic photographic apparatus, the combination of a motor, a plate-magazine, an operating-lever for energizing said motor, means for feeding a plate from said magazine and operated by said lever, a shutter for exposing a plate and means for opening same, an operating-wheel connected with said motor, plate-finishing means, an electric circuit containing a magnet, an armature controlled by said magnet, means for interrupting said motor's action controlled by said armature, said operating-wheel adapted to actuate the finishing means and close the shutter, and said lever adapted to control said circuit.

10. In automatic photographic apparatus, the combination of a series of receptacles for holding material for finishing a photographic plate, an operating-wheel, and means for transferring a plate from one receptacle to another, said wheel provided with means for successively operating such transferring means.

11. In automatic photographic apparatus, the combination with a series of receptacles for holding materials for finishing a photographic plate, each said receptacle provided with a movable carrier for receiving a plate, such carrier adapted to transfer such plate from its respective receptacle to the next carrier, of means for successively actuating such carriers.

12. In automatic photographic apparatus, the combination with a series of receptacles for holding material for finishing a photographic plate, each such receptacle provided with a tilting carrier adapted to transfer a plate from its respective receptacle to the next, of means for successively tilting said carriers.

13. In automatic photographic apparatus, the combination of a series of receptacles for holding material for finishing a photographic plate, each such receptacle provided with a carrier for receiving and holding such plate, each carrier being movable and adapted to transfer such plate from its respective receptacle to another carrier.

14. In automatic photographic apparatus, the combination of a series of receptacles for holding material for finishing a photographic plate, each such receptacle provided with a carrier depending therein for receiving and holding such plate, each carrier adapted to transfer a plate from its respective receptacle to another carrier.

15. In automatic photographic apparatus, the combination of a series of tanks, a series of movable carriers, a carrier being located in each tank, and an operating wheel and motor therefor, said wheel provided with means for actuating said carriers successively.

16. In automatic photographic apparatus, the combination of a series of tanks, a series of movable carriers, a carrier being located in each tank, a series of lever systems connected with said carriers and adapted to actuate same, and an operating wheel and motor therefor, said wheel provided with means for actuating said lever systems successively.

17. In automatic photographic apparatus, the combination of a series of tanks, a series of movable carriers, a carrier being located in each tank, a series of lever systems connected with said carriers and adapted to actuate same, and an operating wheel and motor therefor, said wheel provided with a series of projecting studs, each stud adapted to engage and actuate one of said lever systems.

18. In automatic photographic apparatus, the combination of a series of juxtaposed tanks, a series of tiltable carriers, a carrier being located in each tank, a series of lever systems connected with said carriers and adapted to tilt same, said systems including a row of alined trip members; an operating wheel and motor therefor, said wheel being provided with a series of projecting studs having a path of movement intersecting said trip members, whereby the latter may be engaged and said carriers tilted successively.

19. In automatic photographic apparatus, the combination of a tank, a plate-carrier mounted upon a support permanently located relatively to said tank so as to be movable into and out of the latter, and means for automatically actuating such carrier.

20. In automatic photographic apparatus, a discharging-duct of tubular form having its receiving-end opening located in the lateral wall of the upper portion thereof.

21. In automatic photographic apparatus, a discharging-duct consisting of a tube having a receiving-opening in the lateral wall of the upper tube portion and a lower portion removed from and projecting transversely of the tube-bore.

22. In automatic photographic apparatus, a discharging-duct consisting of a tube having a receiving-opening at its upper end, a discharge-opening at its lower end, and a lower portion removed from said opening and projecting transversely of the tube-bore.

23. In automatic photographic apparatus, the combination of a bath for developing a photographic plate, means for removing said plate from said bath, and an operating-wheel provided with an angularly-adjustable arm for actuating said removing means, said wheel being provided with marks indicating angular intervals of wheel travel, said arm provided with an indicating-pointer located in the vicinity of the marked portion of said wheel.

24. In automatic photographic apparatus, the combination of a camera, a shutter therefor, and means for operating same, plate-feeding means and means for operating same, plate finished means, a motor, and means actuated by the shutter-operating means for controlling the operation thereof, said finishing means operated by said motor.

25. In automatic photographic apparatus, the combination of a camera, a shutter therefor and means for operating same, plate feeding and finishing means, a motor, means actuated by the shutter-operating means for controlling the operation of the motor, said finishing means operated by said motor, said shutter-operating means controlled by the energizing means.

Signed by me this 19th day of November, 1901.

GEORGE N. PIFER.

Attest:
A. E. MERKEL,
D. T. DAVIES,